United States Patent [19]

Shteynberg

[11] Patent Number: 5,682,304

[45] Date of Patent: Oct. 28, 1997

[54] SUPERCONDUCTIVE ELECTROMAGNETIC ENERGY STORAGE APPARATUS AND A METHOD FOR STORING ELECTROMAGNETIC ENERGY

[76] Inventor: Mark Shteynberg, 15527 45th Pl. West, Lynnwood, Wash. 98037

[21] Appl. No.: 623,469

[22] Filed: Mar. 28, 1996

[51] Int. Cl.$^6$ ................................................ H02M 7/00
[52] U.S. Cl. ...................................... 363/75; 363/14
[58] Field of Search ............................ 363/14, 64, 75, 363/91

[56] References Cited

U.S. PATENT DOCUMENTS

| | | | |
|---|---|---|---|
| 4,020,412 | 4/1977 | Rioux et al. | 323/43.5 |
| 4,473,875 | 9/1984 | Parsons et al. | 363/124 |
| 4,609,831 | 9/1986 | Higashino et al. | 307/270 |
| 4,920,095 | 4/1990 | Ishigaki et al. | 505/1 |
| 4,939,444 | 7/1990 | Cacheux | 323/360 |
| 5,146,383 | 9/1992 | Logan | 361/19 |
| 5,159,261 | 10/1992 | Kim et al. | 363/14 X |
| 5,181,170 | 1/1993 | Huang et al. | 363/14 X |

*Primary Examiner*—Peter S. Wong
*Assistant Examiner*—Y. J. Han
*Attorney, Agent, or Firm*—Kevin S. Costanza

[57] ABSTRACT

A superconductive system for receiving electromagnetic energy from an outside source, storing electromagnetic energy in two interacting forms of DC and AC electric current, and delivering electromagnetic energy to an outside load wherein the electromagnetic energy is charged into and discharged from the superconductive storing system exclusively via inductive coupling links. The electromagnetic energy is stored in the form of DC current in high-capacity superconductive coils with each coil connected into a superconductive permanent close loop circuit. The energy is then used to support electromagnetic oscillation in a superconductive oscillating circuit wherein it is stored in low capacity superconductive coils in the form of AC current. The superconducting oscillating circuit is then used to provide power to an outside source.

23 Claims, 10 Drawing Sheets

SUPERCONDUCTIVE ELECTROMAGNETIC ENERGY STORAGE APPARATUS AND A METHOD FOR STORING ELECTROMAGNETIC ENERGY

BACKGROUND OF THE INVENTION

The present invention relates generally to a method for accumulating, storing and discharging electromagnetic energy, as well as to an apparatus designed to perform said method. More particularly, it relates to a superconductive apparatus and method for receiving energy, storing it in two interacting forms of direct current ("DC") and alternating current ("AC"), and delivering electromagnetic energy to an external user, wherein the energy transfer utilizes inductive links with outside devices.

The present invention has an extremely broad application, ranging from use in large-capacity, stationary energy storage units for power plants and power transportation to medium-capacity, portable or stationary energy storage units for household, industry, or on board vehicles, vessels, air and spacecraft, etc.

From the time of the earliest superconductors, the seemingly endless capability of storing energy as electrical current circulating in a superconductive coil has been a very attractive alternative to the presently used energy sources and methods of producing electrical power. After the discovery of high temperature superconductivity, the temptation to create such an energy storage device triggered a surge of attempts to finally develop a practical device or method capable of replacing the old technology for energy.

The electromagnetic energy (E) of the current (I) circulating in a superconductive coil with self-inductance (L) is:

$$E = \frac{L \cdot I^2}{2}$$

The amount of energy contained in 40 liters of gasoline, which is an average volume of a tank for a small car, is $1.0 \times 10^9$ Joules. For a coil with a self-inductance (L) within a technically feasible range from 1 to 25 Henrys, the current (I) required to accumulate $1.0 \times 10^9$ Joules of energy (E) ranges from 44,721.36 to 8,944.27 Amperes. Such a coil will produce a total magnetic flux ($\vec{\Phi}$) ranging from 44,721.36 to 223,606.75 Webers.

The total magnetic flux ($\vec{\Phi}$) generated by a coil, assuming that the magnetic flux density ($\vec{B}$) inside a coil with inner diameter (D) is uniformed and equidirectional, is described by the known formula:

$$|\vec{\Phi}| = |\vec{B}| \cdot \pi \cdot \frac{D^2}{4},$$

Where:

$$\pi \cdot \frac{D^2}{4}$$

is the area (S) of the cross-section inside the coil.

Unfortunately, all of the known commercially available superconductive materials have a modest level of "critical magnetic flux density" ($B_c$). When the magnetic flux density $|\vec{B}|$ inside the coil becomes greater than $B_c$, the material of the coil loses its superconductive property. For example, commercially available high temperature ceramic superconducting wire has $B_c \leq 1$ Tesla. Thus, according to the formula above, a coil with total magnetic flux $|\vec{\Phi}|$ ranging from 44,721.36 to 223,606.75 Webers and capable of accumulating $1.0 \times 10^9$ Joules of energy must have an inner diameter within the range of 238.62 to 533.58 meters.

Thus, large quantities of energy stored in a coil are accompanied by extremely large magnetic fluxes. To accommodate this magnitude of magnetic flux, a practical device must either utilize materials capable of withstanding very high magnetic flux density or be of a very large-scale.

Prior to the present invention, the tendency in the industry was to solve the above problem with large-scale energy storage devices. There have also been modular devices in which superconducting energy storage was accomplished using a plurality of small-dimensioned, low capacity, modular energy storage devices inter-connected into a large-capacity storage system. However, due to the significant number of modules involved, these devices can essentially be qualified as large-scale energy storage devices.

The typical engineering problems associated with large-scale energy storage devices include: maintaining the temperature of the storage device below the critical temperature (about 90° K.) and compensating for the considerable forces generated by the superconducting coils. Some examples of devices of this kind are briefly described below.

U.S. Pat. No. 4,920,095 to Ishigaki et al. shows a hybrid magnet-type energy storage device that combines a superconducting toroidal magnet and a superconducting solenoid magnet. The orientation of the magnets is designed to compensate the counteracting forces generated by the superconducting toroidal and superconducting solenoid magnets.

U.S. Pat. No. 5,146,383 to Logan shows a modular-type, superconducting energy storage device combining a plurality of multi-layer winding modules interconnected in an electrical circuit. The whole system is immersed in cryogenic fluid in a dewar measuring up to several hundred meters in diameter.

Considering the amount of cryogenic fluid required to maintain the temperature of a large-scale energy storage device at about 90° K., it is apparent that this type of storage is more theoretical than practical, not to mention the fact that the giant dimensions of the structure impose extreme limitations on possible applications of such a storage device.

Consideration should be also given to the inventions proposing to use a concept with two superconducting coils coupled by mutual induction. A number of these inventions are briefly described below.

U.S. Pat. No. 4,939,444 to Cacheux shows an energy storage device comprising two or more superconducting coils coupled by mutual magnetic flux through a high permeability magnetic core. The close proximity, precise geometrical and dimentional match and precise alignment of the two coils bring the resulting magnetic flux, and consequently magnetic flux density, to zero, eliminating the problem referred to above with respect to "critical magnetic flux density" ($B_c$), and making it possible to store large quantities of energy in devices of moderate dimensions.

In order to charge and discharge the device according to the Cacheux invention, it was proposed to use the striction effect (caused by the penetration of a magnetic field into the coil segment) to control the superconductivity of the main superconducting coil containing the stored energy. When the magnetic flux density of this field exceeds the "critical magnetic flux density" ($B_c$) for the coil, the coil segment loses its superconductive properties. This allows the user to break the solid superconductive loop of the coil and, according to the invention, by breaking the superconductive loop the user can connect the coil to "an external circuit" and "inject" electrical energy into the coil. By the reverse procedure, the user can "extract" the electric energy from the coil to the "external circuit." The anticipated efficiency of the proposed method of charging and discharging the energy storage is about 20%.

However, even if the total active resistance (R) of the coil segment is only $1.0 \times 10^{-6}$ Ohm (for illustration purposes this resistance value is intentionally chosen smaller than practically possible) at total current (I) through the coil equal to $4.0 \times 10^4$ A (according to the invention), the strictioned segment of the coil will generate heat at the rate (Q) equal to:

$$Q = I^2 \cdot R = (4 \cdot 10^4)^2 \cdot 10^{-6} [J/sec] = 1.6 \text{ kW}$$

Given that this amount of thermal energy is released with every charge and discharge of the system, it is unlikely that the coil will maintain its superconducting properties. This is likely due to a rapidly unfolding sequence of reactions as follows: an initial heat release, a resulting suppression of superconductivity, an increase of active resistance, a following increase of thermal energy, etc., concluding with distruction of the coil.

Use of multiple strands, unfortunately, does not help in this case because, in order to obtain a desirable density of energy "packed" in the system, the parameters of electrical current and magnetic field must be close to the critical level for the superconductive material of the coil. Where a plurality of strands work as parallel conductors of the coil, each would have to carry current close to critical density. The suppression of superconductivity in one strand will lead to electric current redistribution between the strands left superconductive. This will result in exceeding the critical current density and, consequently, to the loss of superconductive properties in all the remaining strands.

In addition, even considering the most advanced methods and means of contemporary electronics, to achieve the required level of reliable control for the coil's segment, active resistance within the range 0 to $1.0 \times 10^{-6}$ Ohm is highly unlikely.

Thus, charging and discharging a superconductive electromagnetic energy storage device presents yet another problem in designing a practical storage device. Several attempted solutions to this problem are shown in the inventions below.

U.S. Pat. No. 4,609,831 to Higashino et al. shows an energy storage system comprising two superconductive coils, one for absorbing and one for releasing energy. The energy received by the system is transmitted from the energy releasing coil to the energy absorbing coil through a unipolar capacitor. The unipolar capacitor is sequentially connected to each of the coils, one at a time, by control means reconfiguring circuitry of the energy storing system. The energy is first transmitted from the energy releasing coil to the capacitor. At this stage, the control of the system, using an "on-off self-controllable switch," interrupts the main pass of the electric current circulating in the energy releasing coil and forces the electric current through a diode to the unipolar capacitor. After the capacitor is charged, the control of the system restores the main pass of the current circulating in the energy releasing coil and, using another "on-off self-controllable switch," connects the capacitor to the energy absorbing coil, thus, allowing the capacitor to discharge into the energy absorbing coil circuit.

Several solutions have been presented in earlier inventions employing this concept of reconfiguring the circuitry of the energy storage system for transmitting energy from and to the main storing coils.

U.S. Pat. No. 4,473,875 to Parsons et al. shows an energy storage system in which the current is transmitted by the means of switches, activated by a controller through a set of triggers and timers, and a capacitor, all included in the main energy storing circuit.

U.S. Pat. No. 4,020,412 to Rioux et al. shows an energy storage system which includes a coil with constant inductance and a coil with either variable inductance or plurality of inductances. The energy transfer in this system takes place when the constant inductance coil is connected to or disconnected from the other coil by the means of switches all included in the main energy storing circuit.

Unfortunately, these recommended solutions cannot be used for practical purposes. Using hybrid circuitry where the superconductive elements (e.g., diodes, transistor or thyristors, even with very small active resistances) are connected in series transforms a superconducting circuit into a conventional circuit with the consequential loss of all advantage attributed to superconductivity. Only dramatic, future advances in the fields of semi- and superconductors will make these recommended solutions realistic alternatives. Also, due to the inevitable danger of high energy break-through, the use of conventional switches to interrupt electric current carrying a full charge of energy stored in this type of system can only be considered a theoretical solution.

Storing energy in large quantities in a form capable of a momentary burst release unquestionably imposes a reliability demand to the very foundation principals of operation of such devices. However, the plurality of switches, as proposed in the above inventions, requires automatic controllers or computers to control and synchronize operation of the switches, which decreases the reliability of the whole energy storage system.

Whatever the precise merits, features and advantages of the above cited references, none of them achieves or fulfills the purposes of the superconductive system and method for storing electromagnetic energy in two interacting forms of AC and DC electric current.

SUMMARY Of THE INVENTION

It is therefore a principal object of the present invention to provide an electromagnetic energy storage apparatus and method that can be realized utilizing commercially available technology.

It is also an object of the present invention to provide an energy storage system with AC electric power output.

Another object of the present invention is to provide a high-efficiency, electromagnetic energy storage system capable of receiving, storing and discharging energy.

Another object of the present invention is to provide an electromagnetic energy storage system, the safe operation of which is independent of automatic control devices or their possible malfunction.

It is also an object of the present invention to provide an electromagnetic energy storage system for compact energy storing.

It is yet another object of the present invention to provide a high capacity, yet portable, electromagnetic energy storage system that can be used as a power source on vehicles, vessels, air and spacecraft, etc.

The present invention achieves the foregoing objectives by the use of a method and an apparatus that stores energy in the form of both AC and DC electric current. The advantages of this design include: DC current can be stored in inductive coils having a very high energy storage density; DC current does not lose energy due to hysteresis or eddy-currents and is therefore preferable for long-term, high-capacity energy storing; AC current does not require conductive coupling for transferring energy; and AC current is convenient to use and transform and is therefore preferable as a short-term form of transitional storing energy. Naturally, this invention includes an interactive link between the two forms of electric current. Energy is stored in the form of DC current and is converted into the form of AC current in the specific amount to be transferred outside for consumption.

Thus, according to the present invention, the electromagnetic energy is stored in two forms of electric current (AC and DC). The storage system comprises two interacting, superconductive electrical circuits: at least one high-capacity DC circuit and at least one low-capacity AC circuit. Each DC circuit is capable of receiving and storing from $1.0 \times 10^8$ to $1.0 \times 10^{11}$ Joules of energy, and more. Each AC circuit is capable of containing 500 to 5,000 Joules of energy, and is used for transferring energy from the DC circuit to the outside for consumption by the end-user.

The DC circuit comprises at least one pair of inductive coils, each coil being made out of a superconductive material. Conceptually, any kind of superconductive material can be used for the coils, including organic superconductors and superconductive metals (e.g., niobium-titanium or niobium-tin) and ceramic superconductors (e.g., lanthanum-barium-copper oxide with strontium or yttrium-barium-copper oxide ("1-2-3")). However, superconductive materials with the highest critical temperature, magnetic flux density and electric current density are preferable.

The coils have unequal self-inductances, with the inequality level predetermined by design, and are inductively coupled together through a high permeability magnetic core. By using a pair of inductively coupled superconductive coils with unequal self-inductances, it is possible to control the resultant magnetic flux density generated by the electric current flowing in the coils. Thus, it is possible to maintain the magnetic flux density below the "critical" level ($B_c$) for the superconductive material of the coils.

Electric current initially induced in one of the coils of the DC circuit induces a counter-directed electric current in the coil inductively coupled with the first one. Predetermined by design, the superposition of the magnetic fields generated by the two electric currents results in an overall magnetic field with a magnetic flux density less than "critical" ($B_c$) for the superconductive material of the DC circuit. Keeping the overall magnetic flux density in the vicinity of the coils less than "critical" ($B_c$) allows the user to increase the electric current in the coils up to a level which is limited only by the cross-sectional area of the coil superconductors and, thus, to increase energy storing capacity of the DC circuit.

Another feature increasing the energy storing capacity of the DC circuit is the use of a high permeability magnetic core to couple each pair of coils in the DC circuit. The magnetic core allows the magnetic fields generated by both coils to superimpose within the core volume.

The AC circuit and the superconductive jumper are connected in parallel to at least one coil of the high-capacity DC circuit. The shortened leads of each superconductive inductive coil in the DC circuit with a superconductive jumper provides a permanent, truly superconductive, uninterrupted path for the DC electric current carrying the main amount of stored energy. This configuration guarantees a zero loss, safe energy containment for as long as the DC circuit maintains superconductivity. The parallel orientation of the AC circuit with the superconductive jumper functions as both a buffer between the DC circuit and an outside load and as a DC–AC converter.

With a working frequency of approximately 400 Hertz, the AC load devices (e.g., motors, transformers, etc.) are smaller than DC load devices of the same power, and their dimensions decrease as the working current frequency increases. This indirectly serves one important objective of the present invention, namely, the applicability of the energy storing system for use in vehicles, vessels, etc.

The AC circuit of the present invention comprises a superconductive inductive coil, a magnetic core and a capacitor, connected into an oscillating circuit. All of the wires and connectors in the circuit are superconductive, including the plates of the capacitor. Due to the absence of active resistance, such a superconductive, oscillating circuit will maintain electromagnetic oscillation for a substantial period of time without external power support.

The magnetic core of the AC circuit allows the circuit to be inductively coupled with an outside load, thus providing the load with a sinusoidal power signal with a frequency equal to the resonant frequency of the AC circuit.

In order to maintain a stable AC power output, the rate of energy transfer from the DC circuit to the AC circuit must remain greater than or equal to the load power consumption rate. Essentially, the rate of DC to AC energy transfer determines the maximum limit of load power that the system is capable of providing with energy.

A superconductive coupling connects the DC and the AC circuits for the purpose of energy transfer. The AC circuit is, in turn, connected in parallel to the superconductive jumper mentioned above. The leads connecting the AC circuit to the jumper are superconductive but, per the arrangement of the present invention, can be transformed into a conventional conductive state by the effect of magnetostriction. The devices used to transform the leads, discussed below, will be referred to as electric valves. The electric valves are controlled by a feedback signal from the AC circuit, and transform the leads in and out of a superconductive state in synchronization with the phase of the AC circuit. Thus, at least once per full oscillation cycle, the electric valves open, creating a superconductive coupling between the AC and DC circuits, and allowing for a DC to AC energy transfer in order to maintain stable AC power output.

An AC circuit, for example, with energy storage capacity E=1,000 Joules and a resonant frequency $\omega$=3,000 Hertz, given that the full amount of energy equal to the AC circuit energy storage capacity can be delivered from the DC circuit in one impulse, can support a load power consumption rate, W=3 MWatt, as shown by the formula below:

$$W = E \cdot \omega = 1,000[J] \cdot 3,000[1/sec] = 3,000,000[J/sec] = 3[MW]$$

To further increase the rate of energy transfer, it will be necessary to increase the resonant frequency of the AC circuit. However, this imposes a new category of technical problems (e.g., dramatic growth of losses, unmanageable capacitor voltage increases, etc.). To avoid these problems and yet to broaden the system range of the energy transfer, the present invention allows for a doubling of the frequency of energy transfer without changing the energy capacity or the resonant frequency of the AC circuit.

In an alternate embodiment, the AC circuit is connected into a diagonal of a superconductive bridge circuit which is further connected in parallel to the superconductive jumper mentioned above. All of the wires and contacts in the arrangement are superconductive, and each branch of the mentioned superconductive bridge circuit has a normally closed electric valve controlled by the feed-back signals described above. Opening the electric valves on opposite ends of the AC circuit (pair after pair in the synchronized manner described above) allows energy to be transferred from the DC to the AC circuit twice for each full oscillation cycle of the AC circuit.

The present invention, of course, does not limit the number of independent AC circuits that can be connected to the DC circuit. The ability to utilize a plurality of AC co-phasal or multi-phasal power outputs allows for the creation of an energy storage system with a virtually unlimited energy transfer rate. To provide a safety limit for the AC circuit energy charge and, thus, to keep the amplitude of the AC power output constant, the invention incorporates a limit switch. An electric valve installed in the line connecting AC and DC circuits can, for instance, be used to serve the function of the limit switch. For example, using the amplitude measurement of the AC circuit electromagnetic oscillation as the feed-back signal, it is possible to arrange the valve to shut off when the amplitude reaches a particular maximum level, and the valve to turn on when the amplitude is below some allowed maximum.

The efficiency of the system can be evaluated using data from common transformers. Because all of the energy transfer within the system is provided through inductive and superconductive couplings, the energy losses in the system are attributable to eddy-currents, hysterics and electromagnetic dissipation, just as with transformers. Postulating, for instance, that the system includes five transformer links, each with an efficiency of 95%, the total efficiency of the energy transfer system is:

$$(0.95)^5 \cdot 100\% = 77.4\%$$

In reality, providing the absence of active resistance, it is feasible to anticipate a much higher total efficiency of the system.

In addition, the energy storage method and apparatus of the present invention allow for the recycling of energy. The energy remaining in the AC circuit can be transferred back to the DC circuit when the load consumption rate is zero.

Naturally, the present invention is not limited to the use of a single pair of coils in the DC circuit, or even a single DC circuit. It is not limited as well to the use of single AC circuit interacting with one or plurality of DC circuits. According to the present invention, a multi-phase power output system can be arranged. In fact, it is possible to obtain a three-phase power output by utilizing three AC circuits with the same resonant frequency and having 120° delay between their signals.

The energy storage system according to the present invention is not limited to the rigid arrangements shown in the presented examples. For instance, the inductively coupled coils of the DC circuit can work simultaneously, with one coil receiving an energy charge from outside devices and another transferring energy outside for consumption. Also, one of the coils can be used for both energy transfer operations with another coil working as a magnetic balance. As yet another example, both coils can be used for energy transfer in both directions.

The energy storage system also comprises a means for controlling AC-DC interaction, such as electric valves. This function need not be performed by the specific electric valves described above. Any means known in the prior art can be used for performing this function so long as the essential principal of the present invention is met, namely, there should be a permanent, superconductive, uninterrupted loop path for the electric current carrying the stored energy, with additional superconductive paths connected to it in parallel. Connection and disconnection of the additional paths is not mechanical nor provided by any kind of semiconductor means, but by engaging and disengaging the superconductivity of the parallel paths.

Thus, any known or future electric valves complying with the presented definition of the present invention principal can be used for the present invention.

BRIEF DESCRIPTION OF THE DRAWINGS

The features and advantages of the invention will become more apparent on reading the following description of non-limitive, illustrative embodiments and with reference to the attached drawings, in which.

DETAILED DESCRIPTION OF THE PREFERRED EMBODIMENTS

Figure 1:
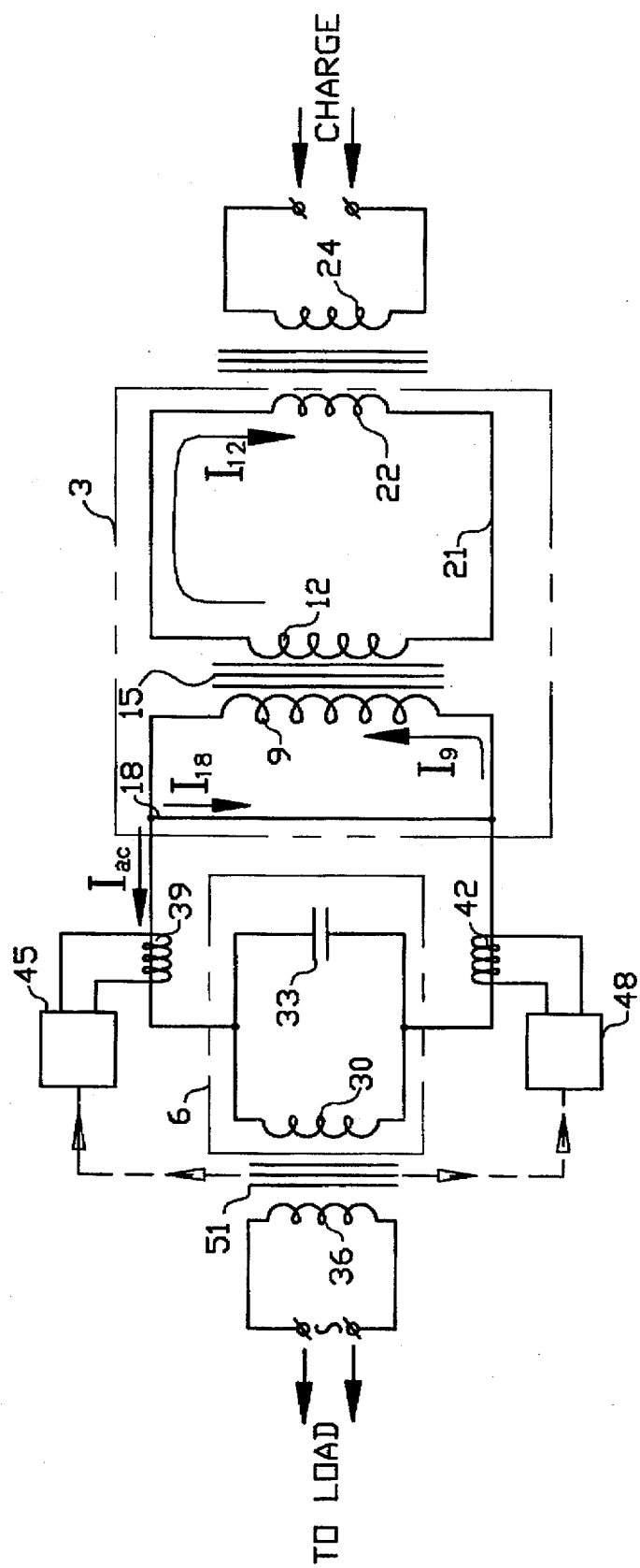
FIG. 1 is an equivalent schematic illustration of a superconductive circuit for storing energy in two interacting forms of DC and AC electrical current according to a first embodiment of the present invention.
Figure 2A:
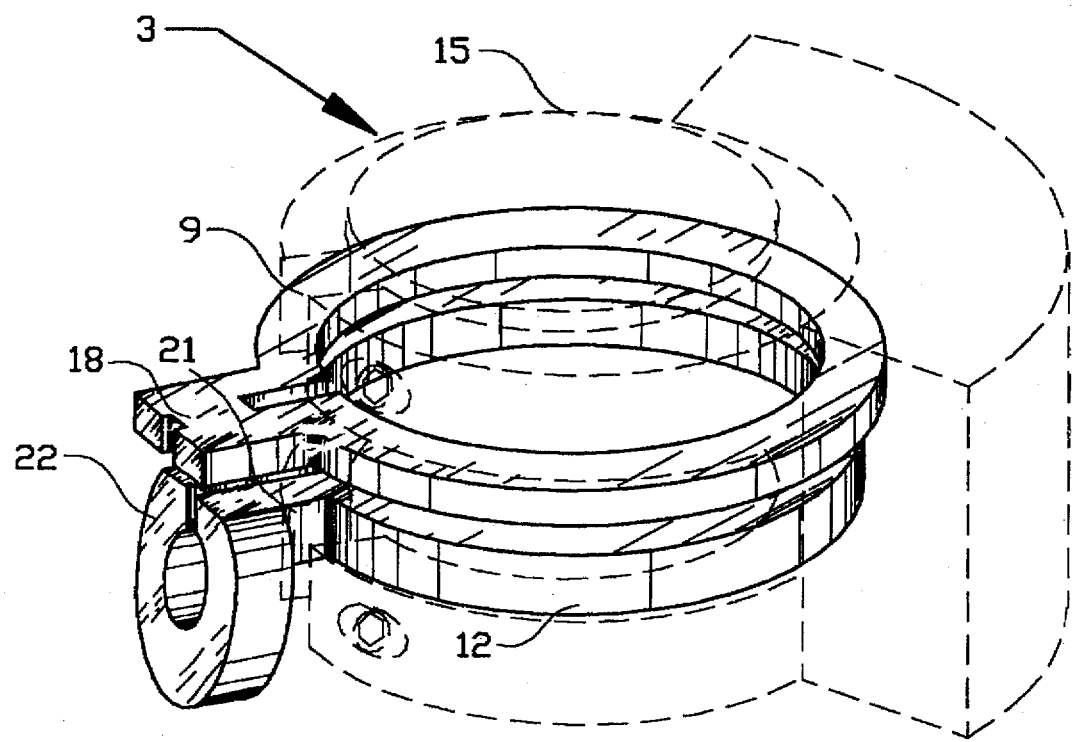
FIG. 2a is a fragmentary, isometric view of DC circuit coils according to the present invention, shown with a coupling magnetic core.
Figure 2B:
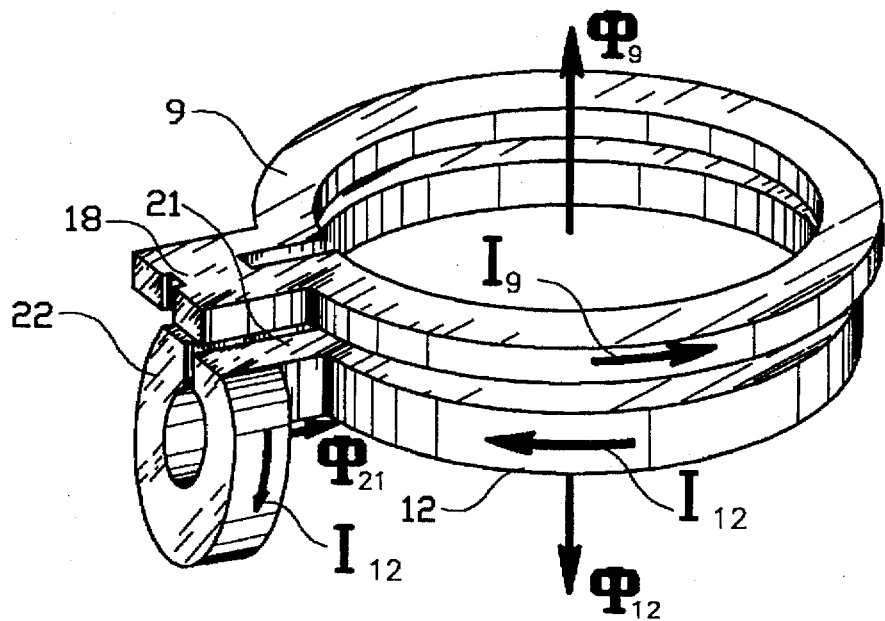
FIG. 2b is a fragmentary, isometric views of DC circuit coils according to the present invention, including a diagrammatic illustration of electric current and magnetic flux arrows.
Figure 3:
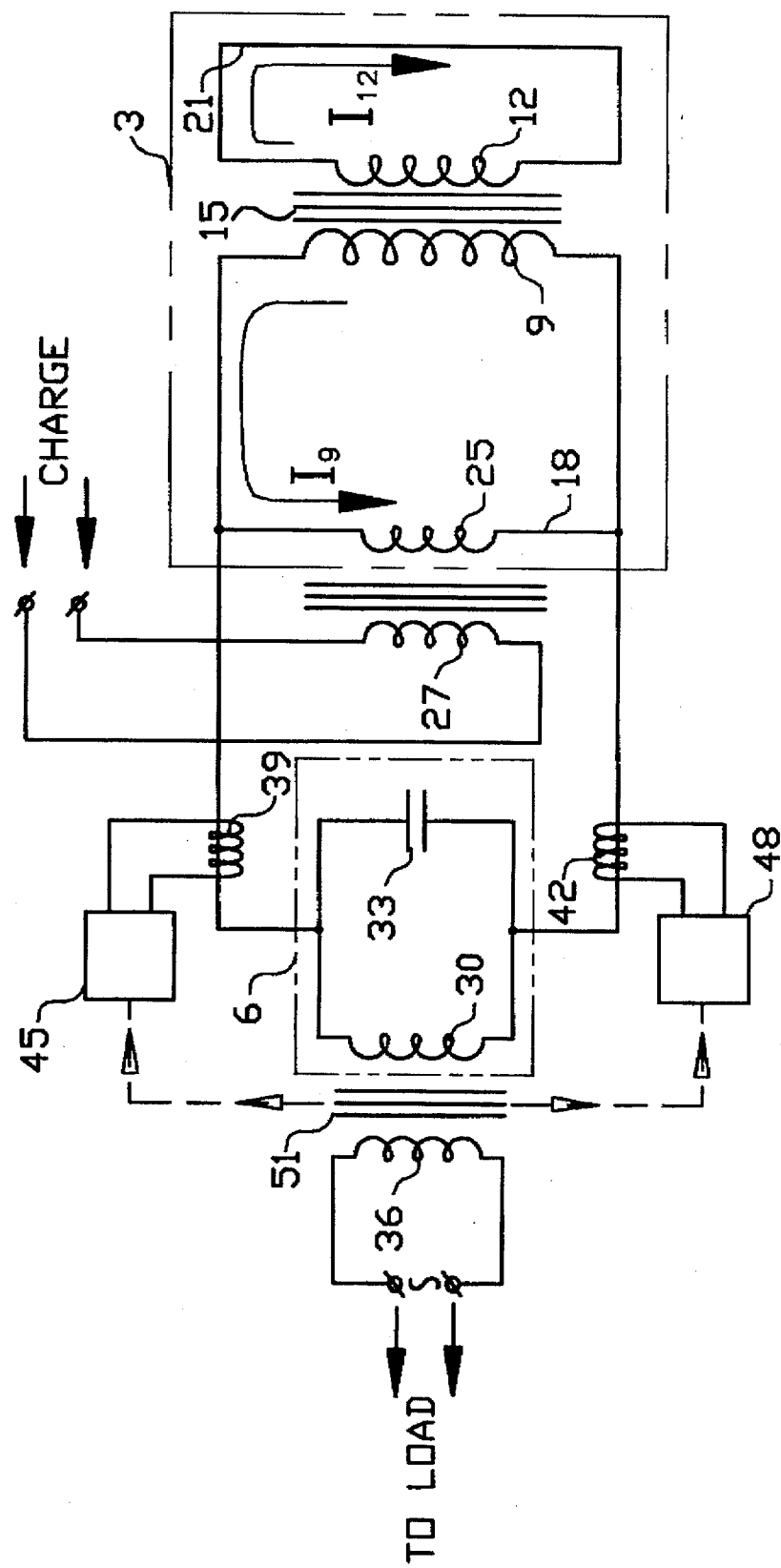
FIG. 3 is an equivalent schematic illustration of a superconductive circuit for storing energy in two interacting forms of DC and AC electrical current according to a second embodiment of the present invention.

FIGS. 1–3 disclose an electromagnetic energy storage apparatus according to a first embodiment of the present invention. This embodiment represents the most general arrangement of the electromagnetic energy storage system, which comprises two major superconductive circuits: a DC circuit 3 and an AC circuit 6. This description will first describe DC circuit 3, followed by a description of AC circuit 6.

FIG. 2a shows one example of DC circuit 3, which comprises a superconductive inductive first DC coil 9, a superconductive inductive second DC coil 12 and a first magnetic core 15 (shown on FIG. 2a in hidden lines). First magnetic core 15 is used for inductive coupling of first DC coil 9 and second DC coil 12.

The terminals of both first DC coil 9 and second DC coil 12 are shortened by superconductive first jumper 18 and superconductive second jumper 21, respectively. In the first embodiment of the present invention, second jumper 21 comprises a superconductive inductive third DC coil 22. First jumper 18 and second jumper 21, complete the permanent, superconductive closed loop circuits for first DC coil 9 and second DC coil 12, respectively, providing uninterrupted superconductive paths for electric current in each close loop circuit.

Formation of electric current $I_{12}$ in second DC coil 12 produces a formation of magnetic flux $\vec{\Phi}_{12}$ due to induction between first DC coil 9 and second DC coil 12, generating electric current $I_9$ in first DC coil 9. Electric current $I_9$ produces magnetic flux $\vec{\Phi}_9$. The total magnetic flux $\vec{\Phi}_{12} - \vec{\Phi}_9$ through first magnetic core 15 with cross-sectional area S produces magnetic flux density $|\vec{B}|$ described by the following formula:

$$|\vec{B}| = \frac{|\vec{\Phi}_{12} - \vec{\Phi}_9|}{S}$$

From the following known equations:

$$|\vec{\Phi}_{12}| = L_{12} \cdot I_{12}$$

$$|\vec{\Phi}_9| = L_{12:9} \cdot I_{12}$$

(where: $L_{12:9}$ is the mutual inductance of first DC coil 9 and second DC coil 12, and $L_{12}$ is the self-inductance of second DC coil 12) it can be shown that, for any given values of $L_{12}$ and $L_{12:9}$, by adjusting $L_{12:9}$, it is possible to obtain the magnetic flux density $|\vec{B}|$ of the total magnetic flux $\vec{\Phi}_{12} - \vec{\Phi}_9$, resulting from superimposing magnetic fluxes $\vec{\Phi}_9$ and $\vec{\Phi}_{12}$, below critical level $B_c$ for the superconductive material used in first lo DC coil 9 and second DC coil 12.

The mutual inductance between the coils is a function of a plurality of parameters such as: the relative positioning of first DC coil 9 and second DC coil 12, the geometry of first DC coil 9 and second DC coil 12, etc. Thus, any of the means known in the prior art can be employed to control $L_{12:9}$ so as to keep it at the level $|\vec{B}|$ that is no greater than the critical value.

To estimate the total energy capacity $E_{TOT}$ of the DC circuit 3, presented in FIG. 1, the following known formula can be utilized:

$$E_{TOT} = \frac{L_9 \cdot I_9^2}{2} + \frac{L_{12} \cdot I_{12}^2}{2} + \frac{L_{21} \cdot I_{12}^2}{2} + L_{12:9} \cdot I_{12} \cdot I_9$$

Where:
$L_9$—self-inductance of first DC coil 9 [H];
$L_{12}$—self-inductance of second DC coil 12 [H];
$L_{21}$—self-inductance of second jumper 21 [H];
$L_{12:9}$—mutual inductance between first DC coil 9 and second DC coil 12 [H];
$I_9$—electric current though first DC coil 9 [A];
$I_{12}$—electric current though second DC coil 12 [A].

For example, a required self-inductance $L_9$ for first DC coil 9 made from commercially available superconductive ceramic 1-2-3 with critical electric current density $$i = 1 \cdot 10^7 \left[ \frac{A}{m^2} \right],$$

having, in this particular example, electric current path area (cross-section of the wire) $s = 4.5 \cdot 10^{-3} [m^2]$, and projected energy capacity $E_9 = 1 \cdot 10^9$ Joules is:

$$L_9 = \frac{2 \cdot E_9}{(i \cdot s)^2} = \frac{2 \cdot 10^9}{(4.5 \cdot 10^{-3} \cdot 10^7)^2} \approx 9.8 \cdot 10^{-1} [H]$$

Therefore, the required self-inductance can be obtained from a superconductive coil with the following parameters:
inner diameter $D_9$ of the coil is 0.8[m],
number of turns N of coil is 1,
relative permeability $\mu$ for material of the magnetic core of the coil is $1 \cdot 10^5$,
magnetic path length $\lambda$ for magnetic coil is $6.7 \cdot 10^{-2} [m]$,
cross-section area S of the magnetic path is $$S = \frac{\pi \cdot D_9^2}{4} = 5.25 \cdot 10^{-1} [m^2].$$

As the self-inductance value of an inductive coil can be determined by the known following formula:

$$L = \frac{0.4 \cdot \pi \cdot \mu \cdot S \cdot N^2}{\pi \cdot 10^6},$$

the coil with parameters presented above has a value of self-inductance $\approx 9.8 \cdot 10^{-1} [H]$.

This can be illustrated by using previously defined parameters in the formula above:

$$L = \frac{0.4 \cdot \pi \cdot 1 \cdot 10^5 \cdot 5.027 \cdot 10^{-1}}{6.45 \cdot 10^{-2} \cdot 10^6} \approx 9.8 \cdot 10^{-1} [H]$$

First DC coil 9 and second DC coil 12 are inductively coupled as shown in FIG. 1. In order to obtain an ultimately high energy storage capacity, yet maintain the smallest dimensions possible, the coils must carry the maximum electric current possible (limited only by the critical current density of the superconductive material used for the coils). This will have the negative impact of creating a high magnetic flux density inside small diameter coils. To effectively keep the resultant magnetic flux density below the critical level, the coils must be substantially identical in size and shape and be located in very close proximity to each other.

Thus, the amount of energy $$E_{12} = \frac{L_{12} \cdot I_{12}^2}{2}$$

stored in second DC coil 12 can be considered equal to the amount of energy $$E_9 = \frac{L_9 \cdot I_9^2}{2}$$

stored in first DC coil 9. Due to the smaller order of the energy values, it is possible to neglect the energy stored due to the mutual inductance of first DC coil 9 and second DC coil 12 and the energy stored in the coil of second jumper 21 without causing a significant error in the estimated value of total energy capacity of DC circuit 3. The total energy can be estimated as:

$$E_{TOT} = E_9 + E_{12} \approx 2 \cdot E_9 \approx 2 \cdot 10^9 [J] \text{ or } \approx 556 [kWh]$$

Third coil 22 of second jumper 21 completes the superconductive, closed-loop circuit of second DC coil 12, and works as a link for providing an inductive coupling between a first charging coil 24 and DC circuit 3. Electromagnetic energy, received from an outside energy source (not shown), passes through first charging coil 24 and is transferred through induction to third DC coil 22 and, thus, to DC circuit 3.

The arrangement for receiving energy shown in FIG. 1 is only one example of the possible embodiments of the present invention. Two other examples are shown in FIG. 3 and FIG. 4.

FIG. 3 discloses an electromagnetic energy storage apparatus according to a second embodiment of the present invention. Second jumper 21 in the superconductive loop circuit of second DC coil 12 does not comprise a superconductive inductive coil as in the previous embodiment. Instead, the superconductive closed loop circuit of first DC coil 9 includes a superconductive fourth DC coil 25 in series with superconductive first jumper of the previous embodiment. Here, in the second preferred embodiment, the superconductive close loop circuit of first DC coil 9 receives energy via second charging coil 27 from outside and transfers energy to the AC circuit 6.

Figure 4:
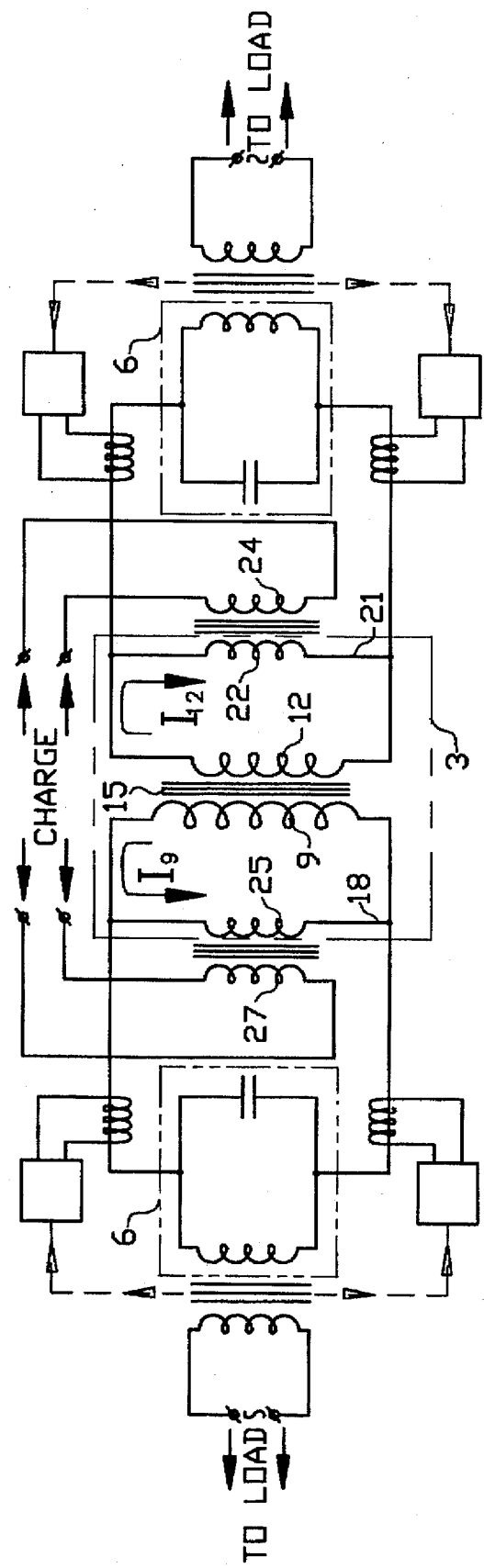
FIG. 4 is an equivalent schematic illustration of a superconductive circuit for storing energy in two interacting forms of DC and AC electric current according to a third embodiment of the present invention.

FIG. 4 discloses an electromagnetic energy storage apparatus according to a third embodiment of the present invention. This embodiment comprises both superconductive inductive third DC coil 22 and fourth DC coil 25 in both superconductive loop circuits of second DC coil 12 and first DC coil 9, respectively. This design allows both superconductive closed-loop circuits (the circuit carrying $I_9$ and the circuit carrying $I_{12}$) to both receive and transfer energy.

FIG. I shows AC circuit 6 and its connection to DC circuit 3 described above. AC circuit 6 is a passive, superconductive, oscillation circuit comprising a superconductive inductive first AC coil 30 with self-inductance $L_{30}$ and a first capacitor 33 with capacitance $C_{33}$.

The absence of active resistance in AC circuit 6 allows current in the circuit to flow with an insignificant amount of damping. Some small attenuation factor, attributed to hysteresis of second magnetic core 51, eddy-current and electromagnetic scattering, does take place. However, because AC circuit 6 is used only to convert energy into AC current and to transfer energy, these losses can be considered negligible for the purposes of present invention (i.e., an energy storage method and apparatus).

Therefore, assuming that the energy in AC circuit 6 remains unchanged and dynamically distributed between first AC coil 30 and first capacitor 33, the total energy value $E_{AC}$ in AC circuit 6 can be considered equal to the peak energy value $E_{30_{MAX}}$ in the first AC coil 30, which is equal to the peak energy value $E_{33_{MAX}}$ in first capacitor 33.

$$E_{AC} = E_{30_{MAX}} = E_{33_{MAX}}$$

To illustrate the feasibility of the preferred embodiment according to the present invention, parameters from commercially available capacitors are used for first capacitor 33, namely, an energy capacity equal to 1,000 [J], and a capacitor's voltage 16,000 [Volt]. Using the known formula for energy stored in a capacitor $$E = \frac{C \cdot V^2}{2}$$

(where: $E = E_{33_{MAX}} = 1,000[J]$, $V = 6,000[Volt]$, $C = C_{33}$) the required capacity value $C_{33}$ for first capacitor 33 can be determined as follows:

$$C_{33} = \frac{2 E_{33_{MAX}}}{(V)^2} = \frac{2 \cdot 1,000}{(16,000)^2} = 7.8125[F] = 7.8125[\mu F]$$

Such parameters fall within a range of realistic values for commercially available devices.

A practical frequency for the power output of the energy storage system will depend on the specific application and a number of specific requirement to the system, however, the frequency value $\omega = 3,000[Hertz]$ is generally practical and, thus, can be used in the following illustrative example.

The frequency of the AC power output of the energy storage system is equal to the resonant frequency of AC circuit 6. Therefore, from the known formula for resonant frequency of an oscillation circuit, $$\omega = \frac{1}{2\pi \sqrt{L_{30} \cdot C_{33}}},$$

it is possible to determine the required self-inductance $L_{30}$ for the superconductive first AC coil 30 of AC circuit 6 as follows:

$$L_{30} = \frac{1}{C_{33} \cdot (2\pi\omega)^2} = \frac{1}{7.8128 \cdot 10^{-6} \cdot (2\pi \cdot 3,000)^2} =$$

$$3.6025 \cdot 10^{-4}[H] \approx 0.36[mH]$$

From the previously defined equation $E_{30_{MAX}} = E_{33_{MAX}}$ and the known formula $$E = \frac{L \cdot I^2}{2}$$

for energy stored by an inductive coil, it is possible to determine amplitude $I_A$ of the current in AC circuit 6. Where $E = E_{30_{MAX}} = 1,000[J]$ and $L = L_{30} = 3.6025 \cdot 10^{-4}[H]$) it follows that:

$$I_A = \sqrt{\frac{2 \cdot E_{30_{MAX}}}{L_{30}}} = \sqrt{\frac{2 \cdot 1,000}{3.6026 \cdot 10^{-4}}} = 2356.205[A]$$

Now, when first AC coil 30 works at the ultimate conditions, namely, with electric current $I_A = 2356.205[A]$ (as determined above), it generates a magnetic flux density using the known formula:

$$|\vec{\Phi}_A| = L_{30} \cdot \vec{I}_A \text{ or } |\vec{B}| \cdot \frac{\pi \cdot D_{30}^2}{4} = L_{30} \cdot I_A,$$

it is possible to determine the inner diameter $D_{30}$ for such coil:

$$D_{30} = \sqrt{\frac{4 \cdot L_{30} \cdot I_A}{\pi \cdot |\vec{B}|}} = \sqrt{\frac{4 \cdot 3.6025 \cdot 10^{-4} \cdot 2356.205}{\pi \cdot 1}} \quad 1.04 \text{ [m]}$$

However, the magnetic flux density value 1 [T] (used in the formula $$|\vec{\Phi}| = |\vec{B}| \cdot \frac{\pi \cdot D_{30}^2}{4} = L_{30} \cdot I_A),$$

even for a single turn inductive coil with the values for self-inductance $L_{30}$ and electric current $I_A$ determined above, will be in disagreement with magnetic flux density value in the center of a wire loop with electric current $I_A$, inner diameter $D_{30}$ and relative permeability $\mu$ of the magnetic core material equal to 5,000. That becomes obvious when using the known formula for magnetic flux density in the center of a round loop of wire:

$$|\vec{B}| = \mu_0 \cdot \mu \cdot \frac{I_A}{D_{30}} = 14.2338[T] > B_C$$

(where $\mu_0$ is permeability of vacuum equal to $$4 \cdot \pi 19 \, 10^{-7} \left[\frac{H}{m}\right])$$

To eliminate this problem, when using a conventional inductive coil with a capacitance of 1,000 [J], self-inductance $L_{30}$=0.36[mH], and relative permeability $\mu$ of the material used for the coil's magnetic core equal to 5,000, either (1), the coil must be substantially larger in order to maintain a magnetic flux density below critical, or (2) the material used for the coil's magnetic core must have a relative permeability below 350.

Because it is unlikely that a magnetic material will be found having both a relative permeability below 350 and satisfactory magnetic properties at 3,000 Hertz frequency magnetic field, and because increasing the coil diameter contradicts one of the very objects of the present invention, first AC coil 30 of AC circuit 6 comprises a number of superconductive inductive coils, enumerated as 30a and 30b, with partially compensated magnetic fields shown on FIG. 5a, FIG. 5b, FIG. 6a and FIG. 6b.

Figure 5A:
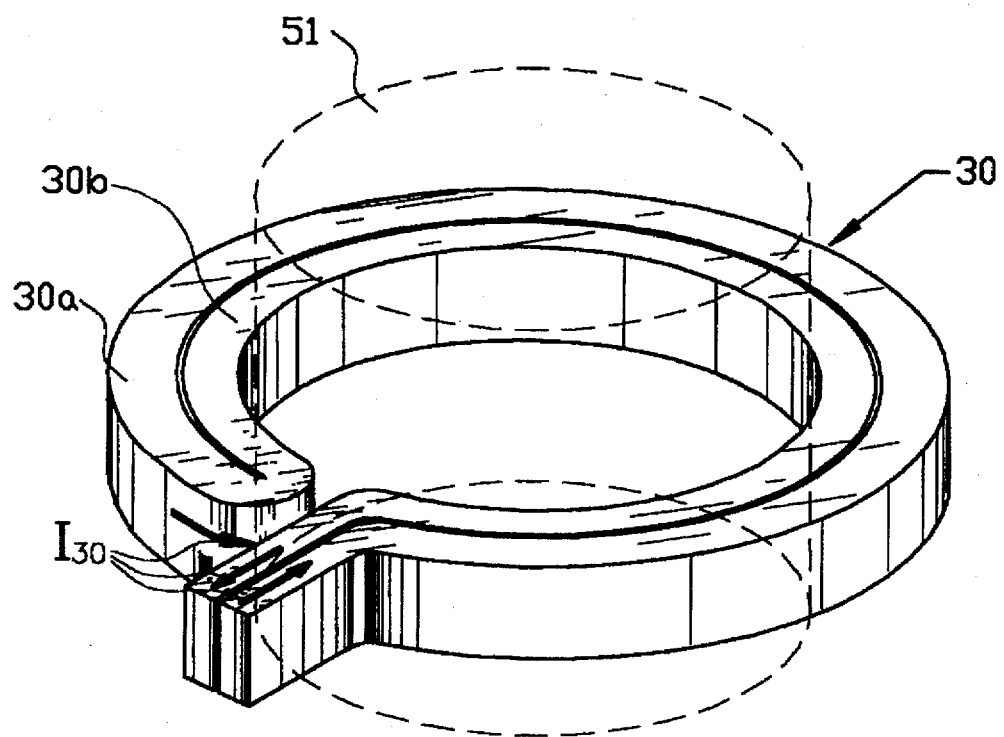
FIG. 5a is a fragmentary, isometric view of one example of a superconductive coil for an AC circuit according to the present invention, including a diagrammatic illustration of electric current.

FIG. 5a shows one example of a design for the preferred embodiment of first AC coil 30 of the present invention.

Figure 5B:
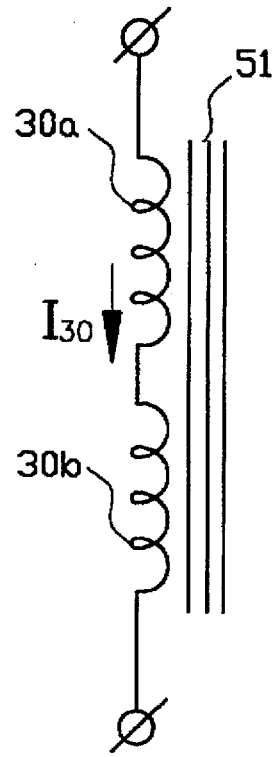
FIG. 5b is an equivalent schematic illustration of thereof.

FIG. 5b presents the equivalent schematics of the design arrangement of FIG. 5a.

First AC coil 30 of FIG. 5a comprises two superconductive inductive coils. The two coils are connected in series and inductively coupled by second magnetic core 51. Second magnetic core 51 of first AC coil 30 is shown on FIG. 5a in hidden lines. Superconductive inductive coils 30a and 30b of first AC coil 30 in FIG. 5a are placed within the same plane, one within the other. Because electric current $I_{30}$ through both coils has the same absolute value, but, as it is shown on FIG. 5a, opposite directions in each coil, the magnetic fields generated by the coils partially compensate for each other.

The formula for magnetic flux density in the center of a round loop of wire, $$|\vec{B}| = \mu_0 \cdot \mu \cdot \frac{I_A}{D_{30}},$$

allows one to evaluate the resulting magnetic flux density in the center of first AC coil 30 after superimposing the magnetic fluxes from coils 30a and 30b. Considering the ultimate conditions discussed above (when electric current $I_{30}$ shown on FIG. 5a and FIG. 5b has an amplitude $I_A$=2356.205[A]) and postulating that the magnetic flux density vector $\vec{B}'$, resulting from electric current $I_{30}$=$I_A$ in the outer coil of first AC coil 30 with diameter $D'_{30}$=1.04[m] (as it was defined above), has 180° angle with vector $\vec{B}''$ of magnetic flux density, the resulting from electric current $I_{30}$=$I_A$ in the inner coil of first AC coil 30 with diameter $D''_{30}$, the equation for the resulting magnetic flux density in the center of first AC coil 30 will be:

$$|\vec{B}' - \vec{B}''| = \mu_0 \cdot \mu \cdot I_A \cdot \left(\frac{1}{D_{30}''} - \frac{1}{D_{30}'}\right)$$

From this equation the equation for $D''_{30}$ is deriving as:

$$D_{30}'' = \frac{\mu_0 \cdot \mu \cdot I_A}{\mu_0 \cdot \mu \cdot I_A + D_{30}'|\vec{B}' - \vec{B}''|} \cdot D'_{30}$$

Imposing the limitation of exceeding the critical magnetic flux density ($|\vec{B}' - \vec{B}''| \leq B_C = 1[T]$) and using all the previously defined values for $\mu_0$, $\mu$, $I_A$ and $D'_{30}$, the diameter $D''_{30}$ for the inner coil of first AC coil 30 can be defined as 0.947[m].

Figure 6A:
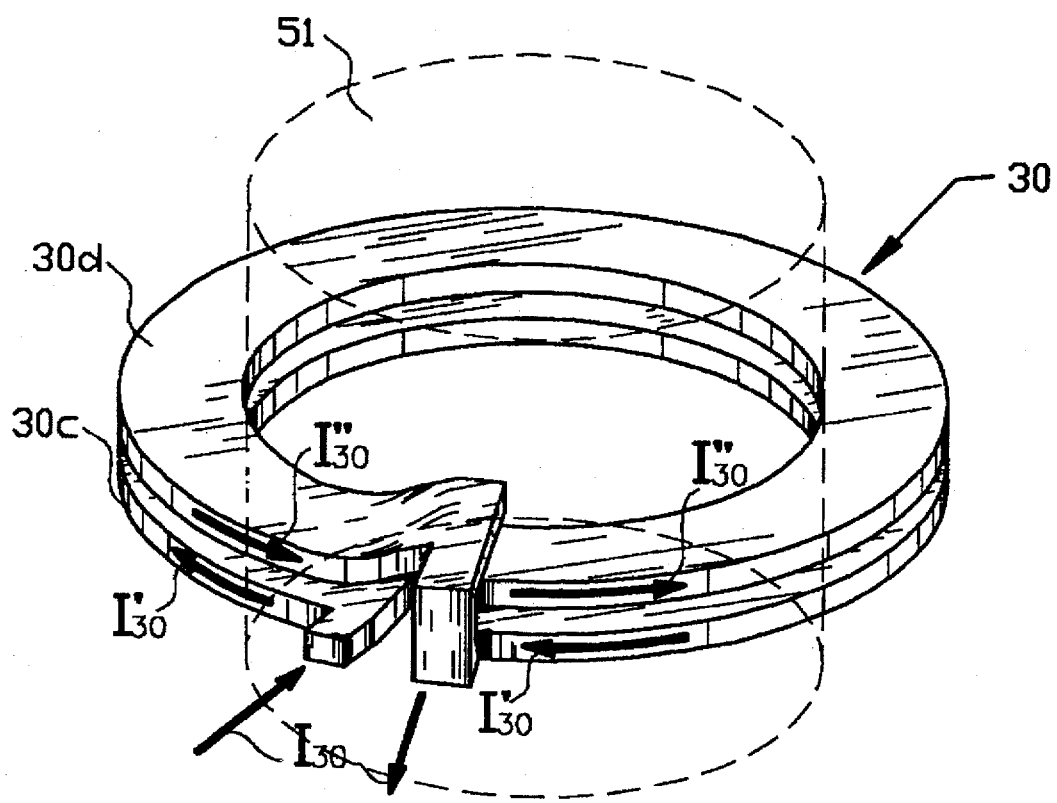
FIG. 6a is a fragmentary, isometric view of another example of a superconductive coil for an AC circuit according to the present invention, including a diagrammatic illustration of electric current.

FIG. 6a shows another example of a design arrangement for the preferred embodiment of inductive first AC coil 30 of the present invention.

Figure 6B:
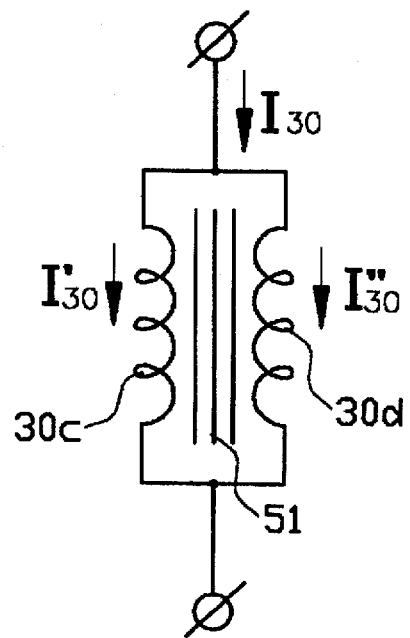
FIG. 6b is an equivalent schematic illustration thereof.

FIG. 6b presents the equivalent schematics of the design arrangement of FIG. 6a.

First AC coil 30 of FIG. 6a comprises two superconductive inductive coils, enumerated as 30c and 30d. The two coils are connected in parallel and inductively coupled by second magnetic core 51. Superconductive inductive coils 30c and 30d of FIG. 6a are placed in two parallel planes, one above the other with their axes coinciding. To partially compensate for the magnetic fields generated by each of the coils, the conductive parallel connection between the two coils are arranged so that electric current $I'_{30}$ in one coil is opposite to electric current $I''_{30}$ in another coil, as shown on FIG. 6a.

Combining the following equation:

$$|\vec{B}' - \vec{B}''| = \mu_0 \cdot \mu \cdot \frac{i}{D_{30}} (s' - s'')$$

derived from the above formula $$|\vec{B}| = \mu_0 \cdot \mu \cdot \frac{I}{D}$$

for magnetic flux density in the center of a round loop of wire, and following formula for electric current:

$$I_{30} = (s' + s'') \cdot i$$

(where s' is a cross-section area of the electric path for current I'$_{30}$ and s" is a cross-section area of the electric path for current I"$_{30}$ as shown on FIGS. 6a and 6b) into a system, it is possible (under assumption that vector $\vec{B}'$ of magnetic flux density, resulting from electric current I'$_{30}$ in one of the coils of first AC coil 30 has 180° angle with vector $\vec{B}''$ of magnetic flux density, resulting from electric current I"$_{30}$ in another coil of first AC coil 30) to determine the required values for s' and s" for any known values of, I$_{30}$, D$_{30}$, μ.

For example, using the same values as in the case when the coils were connected in series as on FIGS. 5a and 5b, for commercially available superconductive material 1-2-3 with $$i = 1,000 \left[ \frac{A}{m^2} \right]$$

and with the limitation ($|\vec{B}'-\vec{B}''| \leq B_c = 1[T]$) not to exceed critical magnetic flux density the required values for s' and s" are:

$$s' \approx 1.261[m^2] \text{ and } s'' \approx 1.095[m^2]$$

As it was mentioned above, the energy capacity of AC circuit 6 of the present invention is limited by a few thousand Joules (see FIG. 1 for references). To maintain a steady system power output, the rate of energy transfer from DC circuit 3 to AC circuit 6 must be greater than or equal to the rate of energy consumption of the outside load.

FIG. 1 will be used to illustrate the following description of the mechanism of energy transfer from DC circuit 3 to AC circuit 6.

According to the example of the preferred embodiment shown on FIG. 1, AC circuit 6 is connected to DC circuit 3 as a branch parallel to superconductive first jumper 18. The connection is provided by superconductive wire leads with the superconductivity of at least one of the leads in a normally suppressed state. Therefore, the total active resistance of AC circuit 6 and it's connecting leads can be considered infinitely greater than the active resistance of first jumper 18. The distribution of electric current I$_9$ as shown on FIG. 1 onto I$_{18}$ and I$_{AC}$ can be described by the following equation:

$$I_{18}/I_{AC} = R_{AC}/R_{18}$$

Where: R$_{AC}$ is the total active resistance of AC circuit 6 and it's connecting leads and R$_{18}$ is the total active resistance of first jumper 18.

Due to superconductivity of first jumper 18 and the presence of active resistance in the connecting leads to AC circuit 6, namely when $$R_{18} = 0[\text{Ohm}] \text{ and } R_{AC} \geq 0[\text{Ohm}].$$

It is apparent that:

$$I_{18}/I_{AC} = R_{AC}/R_{18} = \infty \text{ or } I_9 = I_{18} \text{ and } I_{AC} = 0[A]$$

Therefore, the branch including AC circuit 6 can be considered as normally disconnected from DC circuit 3.

Accumulation of large energy quantities is naturally associated with the risk of instant release of the stored energy caused by the storage system malfunctioning. Such a release is a serious safety issue. Therefore, one essential feature of the preferred embodiment is that the arrangement for connecting and disconnecting AC circuit 6 as a parallel branch to the superconductive first jumper 18 does not cause interruptions to the energy carrying electric current in DC circuit 3.

The energy storage system, according to the preferred embodiment shown on FIG. 1, comprises a normally closed first electric valve 39, which controls the flow of electricity to AC circuit 6. As it was mentioned above, first electric valve 39 is in the normally closed position, keeping the superconductivity of the wire leads to AC circuit 6 normally suppressed.

Figure 7A:
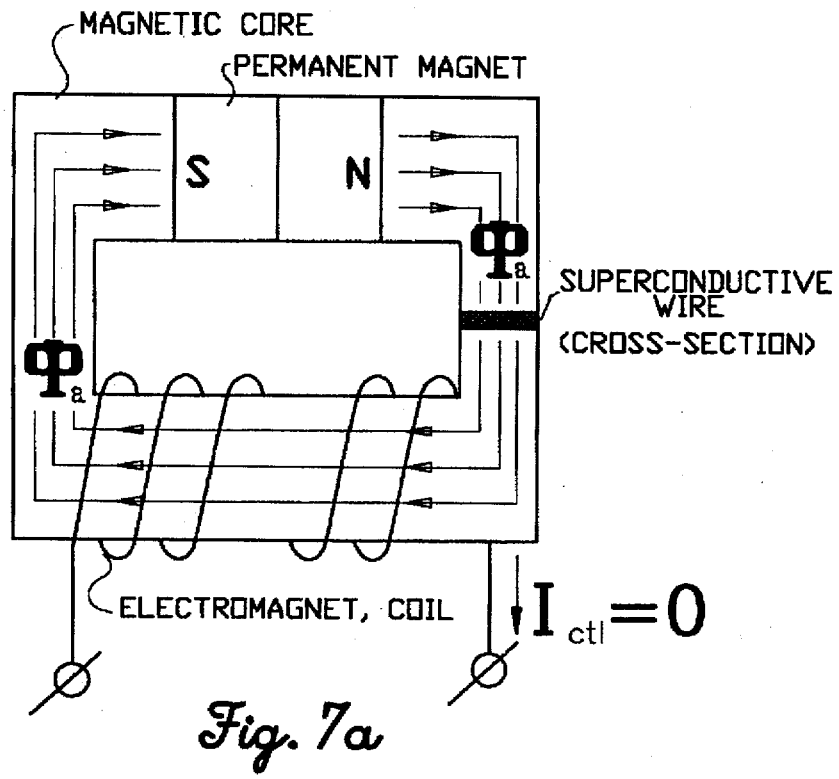
FIGS. 7a and 7b are equivalent diagrammatic illustrations, in two operational phases, of one example of an electric valve according to the present invention with diagrammatic illustration of electric current and magnetic flux.
Figure 7B:
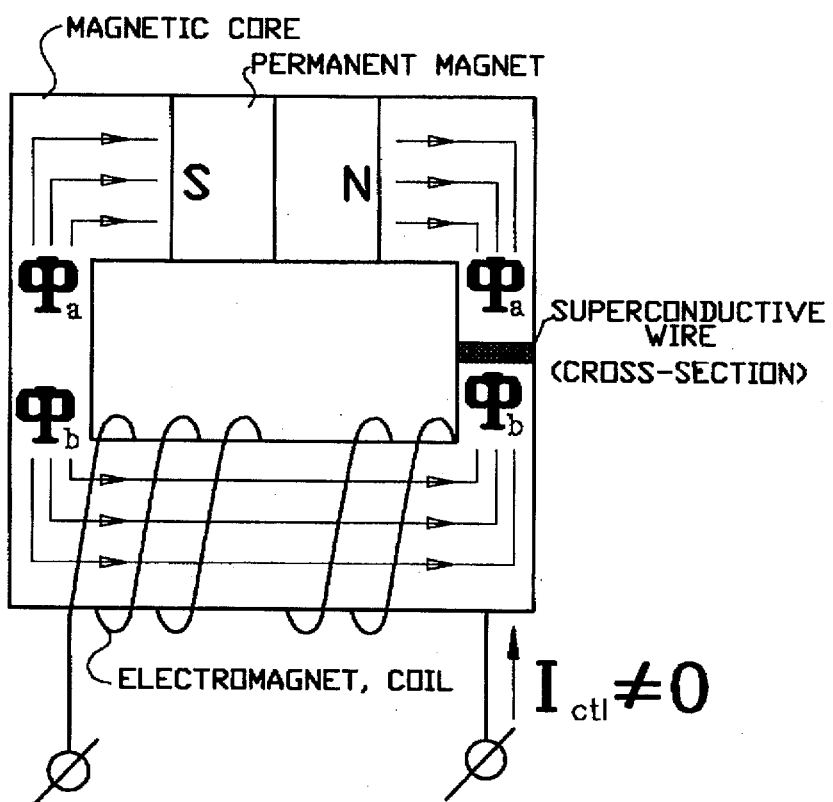

FIGS. 7a and 7b show one example of an arrangement for first electric valve 39 in the form of equivalent magnetic circuitry.

Because the electric valves are not a subject of the present invention, the example shown in FIGS. 7a and 7b is used merely to illustrate the general concept of energy transfer from DC circuit 3 to AC circuit 6.

As shown on FIG. 7a, the magnetic circuit of a normally closed electric valve might be comprised of a magnetic core, a permanent magnet and an electromagnetic coil. In its normal state, the electric current I$_{en}$ in the electromagnetic coil equals zero and the permanent magnet produces a magnetic flux $\Phi_b$ with a magnetic flux density greater than the critical magnetic flux density B$_c$ for the superconductive material of the leads to AC circuit 6. Therefore, the segment of the superconductive lead to AC circuit 6 within the magnetic core loses its superconductive properties, thus, closing the valve.

To open the electric valve, electric current I$_{en}$ in the electromagnetic coil is generated in a direction that produces a magnetic flux $\Phi_b$ opposite to magnetic flux $\Phi_a$. As a result of superimposing the two magnetic fluxes, the magnetic flux density throughout cross-section of the magnetic core becomes smaller than the critical magnetic flux density B$_c$. Therefore, the segment of the superconductive lead to AC circuit 6 within the magnetic core is returned to its superconductive state.

Second electric valve 42 shown on FIG. 1 is normally opened. Thus, second electric valve 42 is open when electric current through the electromagnetic coil is zero and closes when I$_{en} \neq 0$. To obtain this result, the permanent magnet for second electric valve 42 can be installed with polarity opposite to the polarity used in first electric valve 39. At the same time, this magnet should be weaker than the one used in first electric valve 39 in order to maintain the magnetic flux density throughout cross-section of the magnetic core less than critical in the valves normal state. Then, as a result of superimposing magnetic fluxes, the permanent magnet and electric magnet together produce a magnetic flux density throughout cross-section of the magnetic core greater than the critical magnetic flux density B$_c$ and suppress superconductivity of a segment of the lead to AC circuit 6, closing the valve.

The time and duration of opening for first electric valve 39 is controlled by feedback signals from a transducer (not shown on FIG. 1) detecting dynamic conditions of AC circuit 6. For example, as shown on FIG. 1, the feed-back signal is a result of measuring the magnetic flux of second magnetic core 51. However, the specific type of measurement transducer and measurement arrangement is not essential. It is only necessary that the feed-back loop detects the correct dynamic conditions (the phase of free electromagnetic oscillation taking place in AC circuit 6) which dictate when AC circuit 6 is ready to be connected to DC circuit 3 and absorb the next energy charge.

Figure 8A:
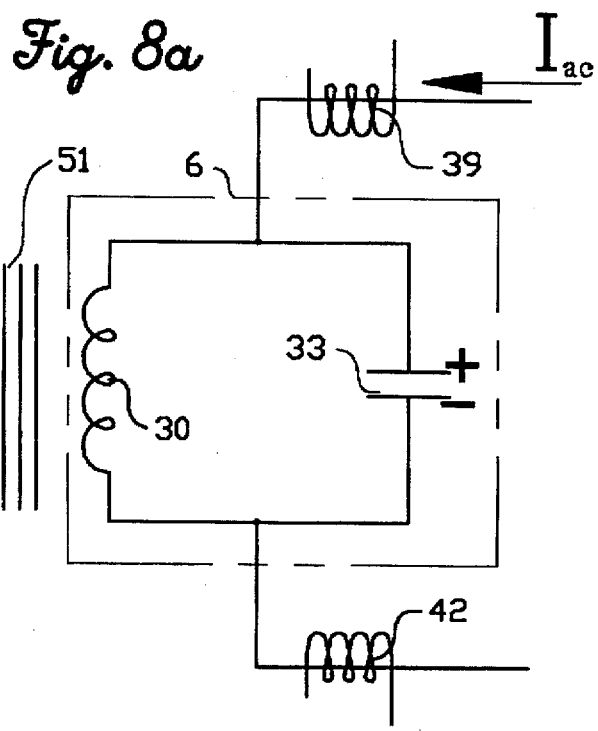
FIG. 8a is an equivalent schematic illustrations of an AC circuit with adjacent superconductive leads and electric valves.
Figure 8B:
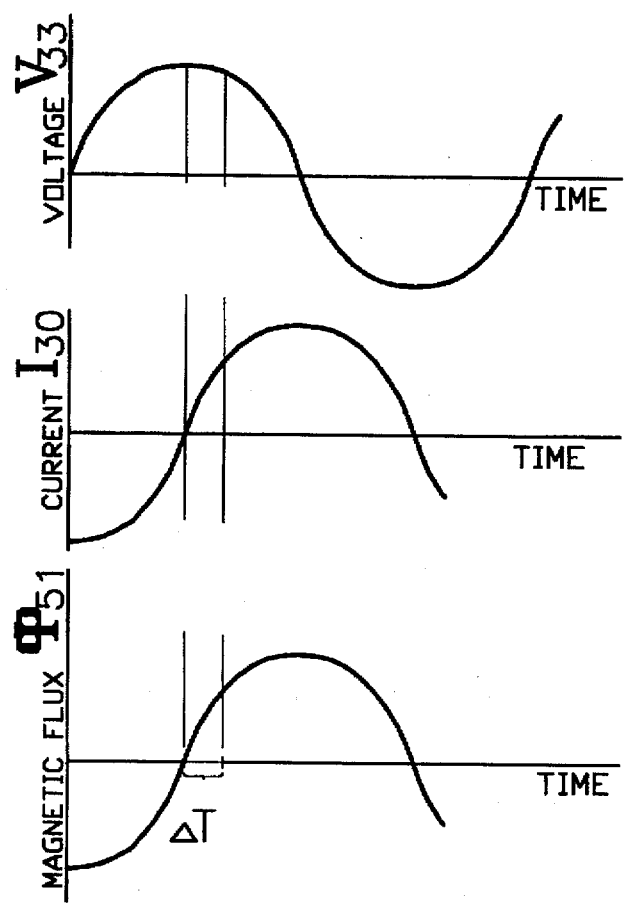
FIG. 8b is a wave form chart illustrating the dynamic operating conditions of the same AC circuit as a function of voltage, electric current and magnetic flux produced by the circuit.

FIG. 8b shows the wave form diagrams to illustrate possible arrangements for obtaining the required feed-back signal.

Due to the sinusoidal nature of the electromagnetic oscillation of AC circuit 6, electric current I$_{30}$ so of first AC coil 30, voltage V$_{33}$ of first capacitor 33, and magnetic flux $\Phi_{51}$ of second magnetic core 51 (see FIG. 8a for references) are rigidly interrelated and, thus, can be mathematically expressed as a function of the others. Therefore, a measurement of any one of them can be used for a feed-back signal. On FIG. 8b, the location of the left margin of time segment $\Delta T$ defines the time of first electric valve 39 opening and the length of the time segment $\Delta T$ represents the duration of the opening.

The duration of the opening of first electric valve 39 is determined based on the sufficiency of AC circuit 6 energy charge restoration.

Depending on the particular type of measurement chosen for the feed-back signal the first controller 45 receiving the signal might use the following algorithms to define the time to open first electric valve 39:

a) "first electric valve 39 is open when magnetic flux $\Phi_{51}=0$ and derivative $$\frac{d\Phi_{51}}{dt} > 0"$$

for the case shown on FIG. 1)
or b) "first electric valve 39 is open when voltage $V_{33} \geq 0$ and derivative $$\frac{dV_{33}}{dt} = 0"$$

(for the case when voltage $V_{33}$ of first capacitor 33 is used for feedback signal)
or c) "first electric valve 39 is open when electric current $I_{30}=0$ and derivative $$\frac{dI_{30}}{dt} > 0"$$

(for the case when electric current $I_{30}$ of first AC coil 30 is used for feedback signal).

Naturally, the algorithms above define the same dynamic conditions of AC circuit 6 and present just some possible options to illustrate the general principal of operation.

The initial signal to open first electric valve 39 could be a manual reset function or an automatic start function.

As shown on FIG. 8a (the enlarged fragment of AC circuit 6 shown on FIG. 1), the superconductive leads to AC circuit 6 are carrying the electric current $I_{ac}$ when both first electric valve 39 and second electric valve 42 are open. Second electrical valve 42 is normally open. It functions as an overcharge shut-off valve when AC circuit 6 is charged to its full capacity. Using the same type of measurements as for the feed-back signals to first electric valve 39, the second controller 48 keeps second electric valve 42 open when the amplitude of chosen measurement does not exceed the specified limit, and closes it when the amplitude of chosen measurement becomes greater than the specified limit.

With duration $\Delta T$ (FIG. 8b) sufficient to restore the full energy charge (E) of AC circuit 6, the possible maximum rate of energy transfer (W) from DC circuit 3 to AC circuit 6 is a linear function of the resonant frequency ($\omega$) of AC circuit 6:

$$W = E \cdot \omega$$

Figure 9:
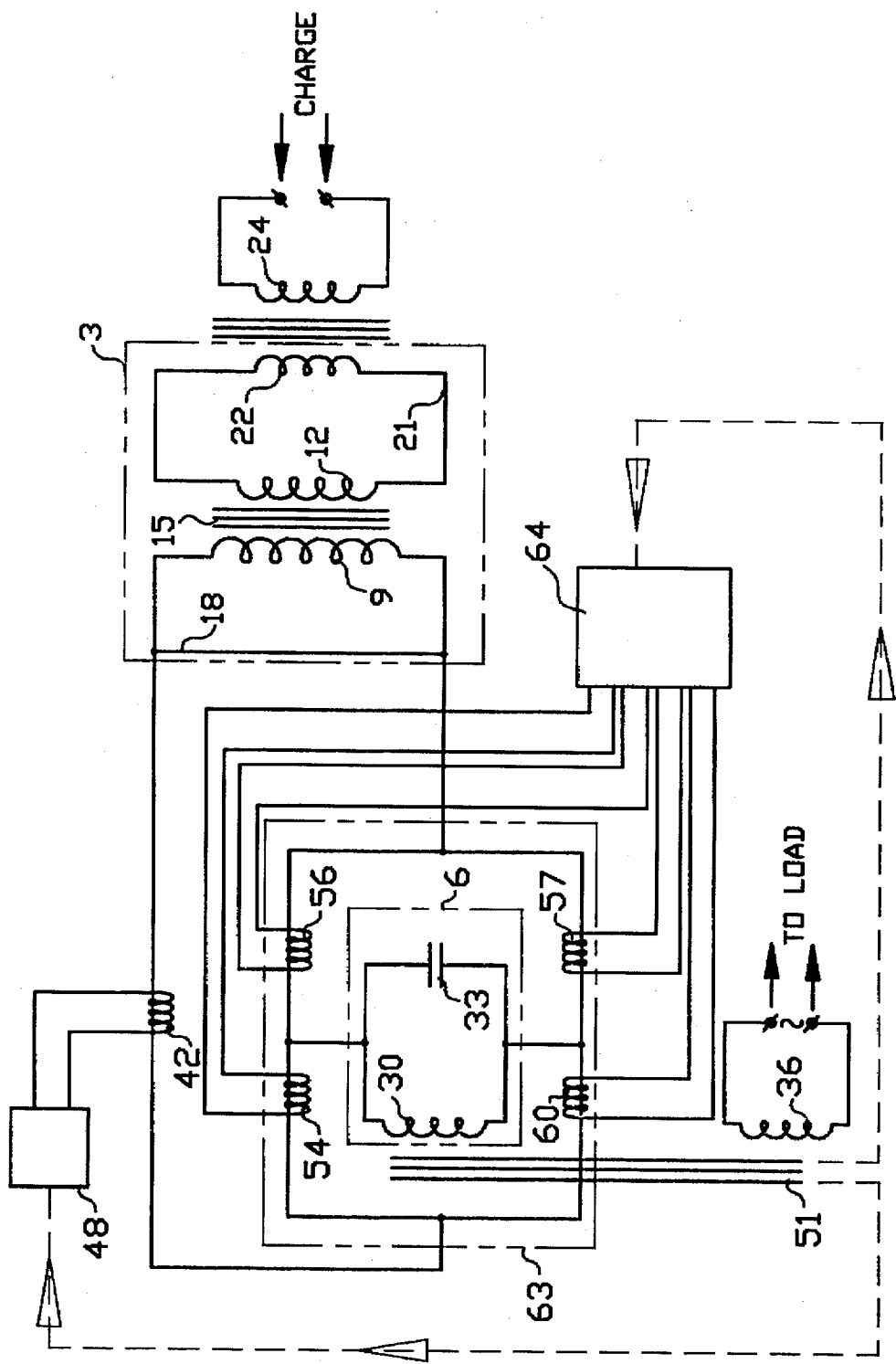
FIG. 9 is an equivalent schematic illustration of a superconductive circuit for storing energy in two interacting forms of DC and AC electrical current according to a fourth embodiment of the present invention.

FIG. 9 illustrates another embodiment of the present invention. Them, the maximum rate of energy transfer (W) from DO circuit 3 to AC circuit 6 is a linear function equal to twice the resonant frequency of AC circuit 6, or $2\omega$:

$$W = E \cdot (2\omega)$$

The circuit shown in FIG. 9 is an equivalent circuit of an energy storage apparatus in which the connection between DC circuit 3 and AC circuit 6 is arranged through a superconductive bridge circuit 63, in which AC circuit 6 is connected in diagonal. The superconductivity of each branch of bridge circuit 63 is controlled independently by a separate electric valve with all the valves controlled by a bridge circuit controller 64. The general principal of obtaining a feed-back signal for the input to the bridge circuit controller 64 is the same as that described above.

In the case when the measurement chosen for feed-back signal is magnetic flux $\Phi_{51}$ of second magnetic core 51, bridge circuit controller 64, receiving the signal, might use the following algorithm to define the time for opening of electric bridge valves 54, 56, 57 and 60:

"bridge valves 56 and 60 are open when the magnetic flux of second magnetic core 51, $\Phi_{51}=0$, and derivative $$\frac{d\Phi_{51}}{dt} > 0"$$

and

"bridge valves 54 and 57 are open when magnetic flux of second magnetic core 51, $\Phi_{51}=0$, and derivative $$\frac{d\Phi_{51}}{dt} < 0".$$

If the measurement of voltage $V_{33}$ of first capacitor 33 is used for the feed-back signal, bridge circuit controller 64, receiving the signal, might use the following algorithm to define the time for opening of electric bridge valves 54, 56, 57 and 60:

"bridge valves 56 and 60 are open when voltage $V_{33} \geq 0$ and derivative $$\frac{dV_{33}}{dt} = 0".$$

and

"bridge valves 54 and 57 are open when voltage $V_{33} \leq 0$ and derivative $$\frac{dV_{33}}{dt} = 0".$$

If the measurement of electric current $I_{30}=0$ of first AC coil 30 is used for the feed-back sign, then bridge circuit controller 64, receiving the signal, might use the following algorithm to define the time opening of electric bridge valves 54, 56, 57 and 60.

"bridge valves 56 and 60 are open when electric current $I_{30}=0$ and derivative $$\frac{dI_{30}}{dt} > 0"$$

and

"bridge valves 54 and 57 are open when electric current $I_{30}=0$ and derivative $$\frac{dI_{30}}{dt} < 0".$$

The main advantage of the arrangement presented in FIG. 9 versus the arrangement presented on FIG. 1 is that the former allows for a doubling of the energy transfer rate from DC circuit 3 to AC circuit 6, thereby doubling the power of the outside load that can be supported by such energy storage system.

Second electric valve 42 of FIG. 9 functions as an overcharge shut-off valve similar to the one described above for the arrangement presented in FIG. 1.

Figure 10:
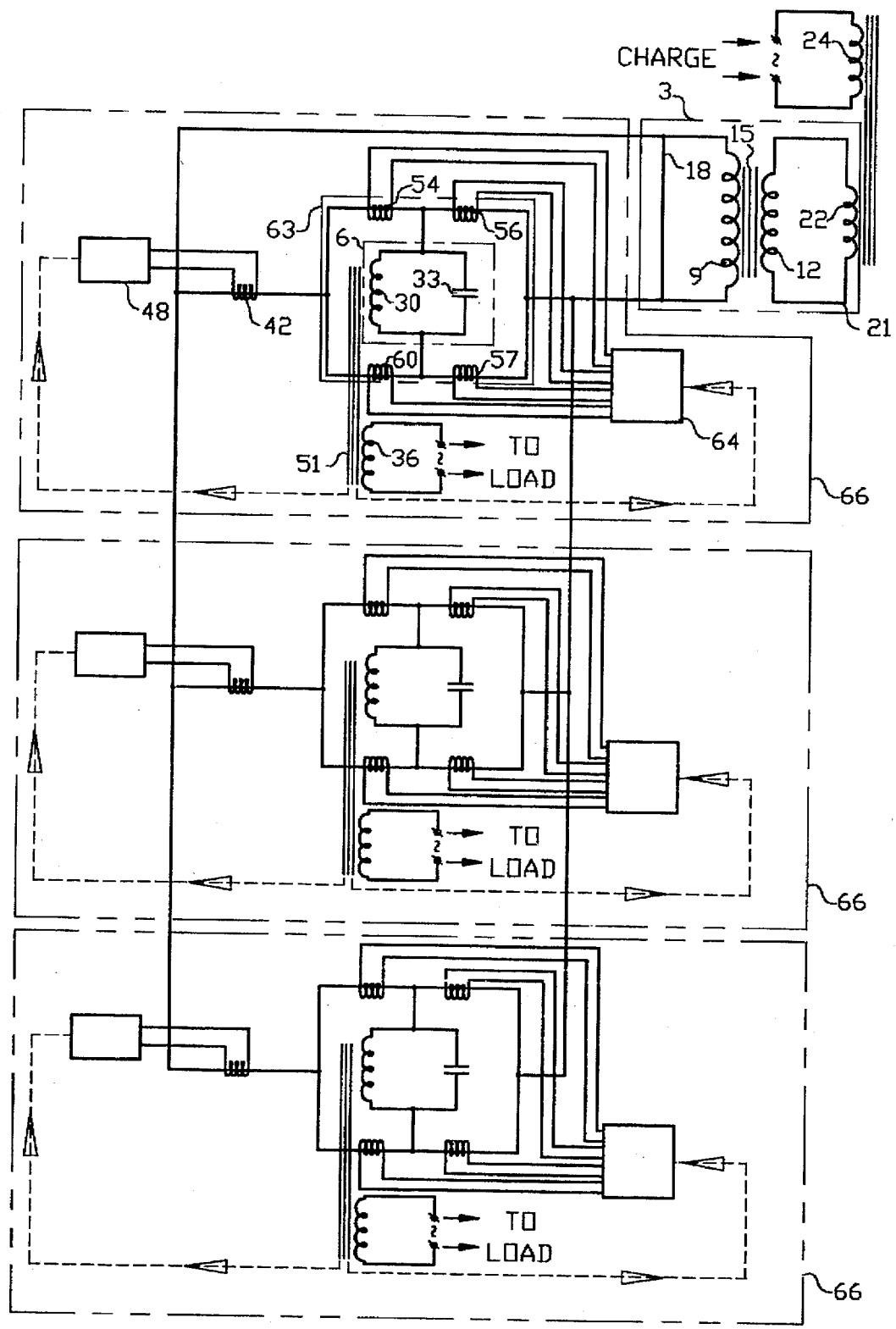
FIG. 10 is an equivalent schematic illustration of a superconductive circuit for storing energy in two interacting forms of DC and AC electrical current according to a fifth embodiment of the present invention.

FIG. 10 shows the equivalent circuitry of a superconductive electromagnetic energy storage apparatus comprising a plurality of independent AC blocks 66. The most general version of superconductive electromagnetic energy storage system would comprise a theoretically unlimited number of AC blocks 66 and DC circuits 3, however, for simplicity, the embodiment presented in FIG. 10 shows an example with only one DC circuit 3 and three AC blocks 66. Each. AC block 66 comprises AC circuit 6, superconductive bridge circuit 63 with electric valves 54, 56, 57, and 60, controllers 64 and 48, second magnetic core 51 and first discharging coil 36, providing a connection with an outside load. Each of the elements included in AC block 66 was separately described above.

Due to the independent nature of the AC block arrangement shown on FIG. 10, such an energy storage system can have virtually unlimited power output. It also allows one to arrange two, three or multi-phasal power output by adjusting the interaction between the different AC blocks. Using a plurality of DC circuits 3, it is possible to increase energy capacity of the system.

Now that the preferred embodiments of the present invention have been described detail, various modifications and improvements thereon will become readily apparent to those skilled in the art. Accordingly, the spirit and scope of the present invention is to be construed broadly and limited only by the appended claims, and not by the forgoing specification.

What is claimed is:

1. An apparatus for receiving, storing, and providing electromagnetic energy, comprising:

at least one superconductive DC circuit comprising a superconductive first DC coil, a superconductive second DC coil, a superconductive first jumper shortening the terminals of said first DC coil, a superconductive second jumper shortening the terminals of said second DC coil, and at least one first magnetic core, said first DC coil and said second DC coil being inductively coupled together and said first magnetic core being positioned within the magnetic fields generated by said first DC coil and said second DC coil;

at least one superconductive AC circuit comprising a superconductive first AC coil and a superconductive first capacitor whereby a superconductive oscillating circuit is formed;

a superconductive first wire lead connecting a first end of said AC circuit to said DC circuit;

a superconductive second wire lead connecting a second end of said AC circuit to said DC circuit, said second end of said AC circuit being opposite from said first end, whereby said AC circuit is connected to said DC circuit in parallel with at least one of said jumpers;

at least one first electric valve disposed along one of said wire leads whereby electromagnetic energy transfer between said DC circuit and said AC circuit is regulated;

a charging means whereby an electromagnetic energy charge is delivered to said DC circuit; and a discharging means whereby said AC circuit provides electromagnetic energy to an outside load.

2. An apparatus according to claim 1 wherein said DC circuit comprises a plurality of said first DC coils and a plurality of said second DC coils, the terminals of each of said DC coils being shortened by a superconductive jumper whereby said first DC coils are inductively coupled with said second DC coils.

3. An apparatus according to claim 1 wherein said AC circuit comprises a plurality of said first AC coils and plurality of said first capacitors.

4. An apparatus according to claim 1 further comprising at least one first controller operating said first electric valve, said first controller receiving a feed-back input signal from said AC circuit whereby the flow of electricity from said DC circuit to said AC circuit is regulated based on the parameters of electromagnetic oscillations in said AC circuit.

5. An apparatus according to claim 1 wherein said second jumper comprises at least one superconductive third DC coil and said charging means comprises at least one first charging coil wherein said first charging coil generates electric current in said third DC coil and charges said DC circuit.

6. An apparatus according to claim 1 wherein said first jumper comprises at least one superconductive fourth DC coil and said charging means comprises at least one second charging coil wherein said second charging coil generates electric current in said fourth DC coil and charges said DC circuit.

7. An apparatus according to claim 1 wherein said first jumper comprises at least one superconductive fourth DC coil; said second jumper comprises at least one superconductive third DC coil; and said charging means comprises at least one first charging coil and at least one second charging coil; said first charging coil being inductively coupled with said third DC coil and second charging coil being inductively coupled with said fourth DC coil, whereby said first DC coil and said second DC coil can be independently or simultaneously charged.

8. An apparatus according to claim 1 wherein said discharging means comprises at least one first discharging coil inductively coupled with said first AC coil whereby said discharging means inductively transmits electromagnetic energy from said AC circuit to said outside load.

9. An apparatus according to claim 1 wherein said first AC coil comprises a plurality of superconductive coils, said plurality of coils being inductively coupled together and alternating in winding direction, whereby the magnetic flux produced by each of said coils counters the magnetic flux produced by any adjacent coil.

10. An apparatus according to claim 1 comprising a plurality of said AC circuits whereby said outside load is provided with polyphase electromagnetic energy.

11. An apparatus for receiving, storing, and providing electromagnetic energy, comprising:

at least one superconductive DC circuit comprising a superconductive first DC coil, a superconductive second DC coil, a superconductive first jumper shortening the terminals of said first DC coil, a superconductive second jumper shortening the terminals of said second DC coil, and a first magnetic core, said first DC coil and said second DC coil being inductively coupled together and said first magnetic core being positioned within the magnetic fields generated by said first DC coil and said second DC coil;

at least one superconductive AC circuit comprising a superconductive first AC coil and superconductive first capacitor whereby a superconductive oscillating circuit is formed;

at least one superconductive bridge circuit comprising at least four electric valves being disposed one along each branch of said bridge circuit, said AC circuit being connected into the first diagonal of said bridge circuit whereby electromagnetic energy transfer through said bridge circuit to said AC circuit is regulated;

a superconductive first wire lead connecting a first end of said second diagonal to a first end of one of said jumpers;

a superconductive second wire lead connecting a second end of said second diagonal to a second end of said jumper, said second wire lead being opposite said first wire lead whereby said bridge circuit is connected to said DC circuit parallel with said jumper;

at least one first electric valve disposed along one of said wire leads whereby the flow of electricity between said DC and said bridge circuits is regulated;

a charging means whereby an electromagnetic energy charge is delivered to said DC circuit; and a discharging means whereby said AC circuit provides electromagnetic energy to an outside load.

12. An apparatus according to claim 11 wherein said DC circuit comprises a plurality of said first DC coils and a plurality of said second DC coils, the terminals of said coils being shortened by superconductive jumpers whereby said first DC coils are inductively coupled with said second DC coils.

13. An apparatus according to claim 12 wherein said discharging means comprises at least one first discharging coil inductively coupled with said first AC coil whereby said discharging means inductively transmit electromagnetic energy from said AC circuit to said outside load.

14. An apparatus according to claim 12 wherein said first AC coil comprises a plurality of superconductive coils, said plurality of coils being inductively coupled together and alternating in winding direction, whereby the magnetic flux produced by each of said coils counters the magnetic flux produced by any adjacent coil.

15. An apparatus according to claim 11 wherein said AC circuit comprises a plurality of said first AC coils and plurality of said first capacitors.

16. An apparatus according to claim 11 further comprising at least one first controller operating said four electric valves and said first electric valve, said first controller receiving a feed-back input signal from said AC circuit whereby the flow of electricity through said bridge circuit to said AC circuit and the flow of electricity from said DC circuit to said bridge circuit are regulated based on the parameters of electromagnetic oscillations in said AC circuit.

17. An apparatus according to claim 11 wherein said second jumper comprises at least one superconductive third DC coil and said charging means comprises at least one first charging coil wherein said first charging coil generates electric current in said third DC coil and charges said DC circuit.

18. An apparatus according to claim 11 wherein said first jumper comprises at least one superconductive fourth DC coil and said charging means comprises at least one second charging coil wherein said second charging coil generates electric current in said fourth DC coil and charges said DC circuit.

19. An apparatus according to claim 11 wherein said first jumper comprises at least one superconductive fourth DC coil; said second jumper comprises at least one superconductive third DC coil; and said charging means comprises at least one first charging coil and at least one second charging coil; said first charging coil being inductively coupled with said third DC coil and second charging coil being inductively coupled with said fourth DC coil, whereby said first DC coil and said second DC coil can be independently or simultaneously charged.

20. An apparatus according to claim 11 comprising a plurality of AC circuits whereby said outside load is provided with polyphase electromagnetic energy.

21. A method of receiving, storing, and providing electromagnetic energy, comprising the steps of:

inductively receiving electromagnetic energy from a charging means by at least one superconductive DC circuit;

storing electromagnetic energy in the form of DC current in at least one superconductive, uninterrupted DC circuit;

transferring electromagnetic energy from said DC circuit through a superconductive connecting circuit to at least one superconductive oscillating circuit whereby the energy is converted from a form of DC current to a form of AC current; and providing electromagnetic energy in the form of AC current through at least one discharging coil inductively coupled with said oscillating circuit to at least one outside load.

22. A method according to claim 21 further comprising the step of regulating electromagnetic energy transfer between said DC circuit and said oscillating circuit wherein an electric valving means provides connection and disconnection between said DC circuit and said oscillating circuit by suppressing and restoring the superconductivity of said connecting circuit.

23. A method according to claim 21 wherein the electromagnetic energy stored in said DC circuit is simultaneously and independently transferred from said DC circuit to a plurality of said superconductive oscillating circuits whereby electromagnetic energy is provided in the form of polyphase AC current.

\* \* \* \* \*